United States Patent
Damson et al.

(10) Patent No.: US 6,981,545 B2
(45) Date of Patent: Jan. 3, 2006

(54) DISCONNECTABLE HEAT EXCHANGER

(75) Inventors: Daniel Damson, Ditzingen (DE); Reiner Hohl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,562

(22) PCT Filed: Dec. 7, 2000

(86) PCT No.: PCT/DE00/04352
§ 371 (c)(1),
(2), (4) Date: Oct. 18, 2001

(87) PCT Pub. No.: WO01/44739
PCT Pub. Date: Jun. 21, 2001

(65) Prior Publication Data
US 2002/0157810 A1 Oct. 31, 2002

(30) Foreign Application Priority Data
Dec. 17, 1999 (DE) .......................... 199 60 929

(51) Int. Cl.
*G05D 23/00* (2006.01)

(52) U.S. Cl. .................... 165/297; 165/51; 237/12.3 A; 237/12.3 B

(58) Field of Classification Search ................ 165/297, 165/51, 41; 237/12.3 A, 12.3 B
See application file for complete search history.

(56) References Cited

U.S. PATENT DOCUMENTS

| | | | |
|---|---|---|---|
| 2,175,121 A | | 10/1939 | Katz |
| 2,401,510 A | | 6/1946 | Rowley |
| 4,095,575 A | | 6/1978 | Wulf |
| 4,126,108 A | | 11/1978 | Christensen |
| 4,461,342 A | * | 7/1984 | Avrea ................... 165/51 X |
| 4,498,525 A | * | 2/1985 | Smith ................... 165/51 X |
| 4,556,024 A | * | 12/1985 | King et al. ............ 165/51 X |
| 4,683,725 A | * | 8/1987 | Sugiura |
| 5,217,085 A | * | 6/1993 | Barrie et al. .......... 165/297 X |
| 5,275,231 A | * | 1/1994 | Kuze |
| 5,894,834 A | * | 4/1999 | Kim ..................... 165/297 X |
| 6,109,346 A | * | 8/2000 | Hill ...................... 165/41 X |
| 6,148,910 A | * | 11/2000 | Warner .................. 165/297 |
| 6,253,548 B1 | | 7/2001 | Ap et al. |
| 6,609,484 B2 | * | 8/2003 | Penn et al. ............ 165/51 X |

FOREIGN PATENT DOCUMENTS

DE  39 37 314 A  5/1990

OTHER PUBLICATIONS

Sonderbeilage "System Partners 98", 5.4 Zur Mtz Jul. 2, 1998.
Dissertation by E.D. Pott "Verbrauchs–Emission–und Heinzkomfortoprimierung...", Berlin 1998, Chapter M20. PP 57–72.

* cited by examiner

*Primary Examiner*—Ljiljana Ciric
(74) *Attorney, Agent, or Firm*—Michael J. Striker

(57) ABSTRACT

A heating exchanger (10) between a cooling conduit and an exhaust-gas line of an internal combustion engine includes a coolant inflow (26) and a coolant return (28) for coolant ducts (14), as well as an exhaust-gas inlet (30) and an exhaust-gas outlet (32) for exhaust-air ducts (36). The heat exchanger is arranged in a main exhaust-gas flow (34), and a shutoff device is provided in the coolant inflow (26).

5 Claims, 1 Drawing Sheet

DISCONNECTABLE HEAT EXCHANGER

BACKGROUND OF THE INVENTION

The invention is based on a heat exchanger according to the preamble of claim 1.

The specific contamination of the environment resulting from the emission of carbon dioxide by internal combustion engines is primarily a factor of their efficiency. This is not satisfactory, among other things, when the internal combustion engine is operated below its optimal operating temperature. In a few operating conditions, such as during cold starting or long downhill driving of motor vehicles, the optimal temperature of the internal combustion engine is not reached, which leads to increased fuel consumption and increased exhaust-gas emissions. During cold starting at low outside temperatures, heat is also needed to deice the windows or to warm the passenger compartment of the vehicle, in order to improve driving safety and comfort. Currently, chemical or electrical supplementary heating systems are used in particular to solve this problem. Their use also results in increased fuel consumption, however.

A heat exchanger was made known in a supplement entitled "System Partners 98", page 4 of the MTZ (Motor Technische Zeitschrift) Jul. 2, 1998 that is installed in an exhaust-gas return line in order to cool the exhaust gas to be returned to a combustion chamber of the internal combustion engine. Cooling the exhaust gas improves the aspiration. Since the heat exchanger is used constantly during the entire operation of the internal combustion engine, heat is continuously absorbed by the coolant of the internal combustion engine, even during full-load operation. In order to prevent overheating of the coolant and the internal combustion engine in this driving state, however, heat must also be dissipated by way of the main radiator of the internal combustion engine. The main radiator and the cooling fans assigned to it must be designed accordingly to be larger in size.

SUMMARY OF THE INVENTION

According to the invention, the heat exchanger is arranged in a main exhaust-gas flow, and a shutoff device is provided in the coolant inflow. As a result, the usable heat of the exhaust air can be used optimally during cold starting, in order to reach the operating temperature of the internal combustion engine as rapidly as possible and to use a sufficient quantity of heat for deicing the vehicle windows, and to warm up the passenger compartment. In his dissertation entitled "Optimization of Fuel Consumption, Emissions, and Heating Comfort in Diesel Vehicles Using Energy Flow Management", E. D. Pott states that the usable heat of the exhaust gas amounts to approximately 1.4 KW in just one driving cycle even in a smaller Diesel internal combustion engine for a passenger car. In a passenger car with an internal combustion engine that functions according to the Otto principle, the usable heat is markedly greater due to higher exhaust-gas temperatures.

When the internal combustion engine has reached its optimal operating temperature, a shutoff valve closes the coolant inflow, thereby interrupting the passage of coolant through the heat exchanger, so that the main radiator of the internal combustion engine and the blower assigned to it do not need to be designed to be larger in size.

So that the coolant remaining in the heat exchanger when the coolant inflow is shut off does not overheat and thereby decompose and cause deposits in the coolant ducts of the heat exchanger, it is appropriate to displace the coolant out of the coolant ducts as soon as the shutoff device in the coolant inflow is closed. The coolant is returned to the coolant ducts shortly before the shutoff device is reopened. To this end, a gas reservoir is connected at a high point of the coolant ducts, from which gas, usually air, is fed into the coolant ducts and later removed.

The gas reservoir is designed in simple fashion as a bellows, on one face of which a connecting line leads to the coolant ducts and on the opposite face of which an actuator acts. This shortens the bellows and thereby presses a corresponding volume of gas through the connecting line into the coolant ducts. The actuator can be operated electrically, hydraulically, and/or pneumatically. When the actuator is reset, the bellows expands again and draws the air out of the coolant ducts.

As an alternative to this, a bypass line is provided between the exhaust-gas inlet and the exhaust-gas outlet, on the branch of which a shutoff device is arranged, in order to control the exhaust-gas inlet and the exhaust-gas outlet in complementary fashion. When the shutoff device closes the coolant inflow, the shutoff device at the branch of the bypass line simultaneously shuts off the exhaust-gas inlet and opens the bypass line. Since exhaust gas no longer passes through the heat exchanger now, overheating of the coolant is reliably avoided.

Basically, the heat exchanger can be arranged in any suitable location in a main exhaust-gas stream of a vehicle. Appropriately, however, it is arranged behind a catalytic exhaust-gas converter in order to prevent the catalytic exhaust-gas converter from being delayed in reaching its operating temperature.

BRIEF DESCRIPTION OF THE DRAWINGS

Further advantages arise out of the following drawing description. Embodiments of the invention are shown in the drawing. The drawing, the description, and the claims contain numerous features in combination. It is appropriate for the expert to also examine the features individually and combine them into additional logical combinations.

The sole FIGURE shows a schematic representation of a disconnectable heat exchanger.

DETAILED DESCRIPTION OF THE PREFERRED EMBODIMENTS

Figure 1:
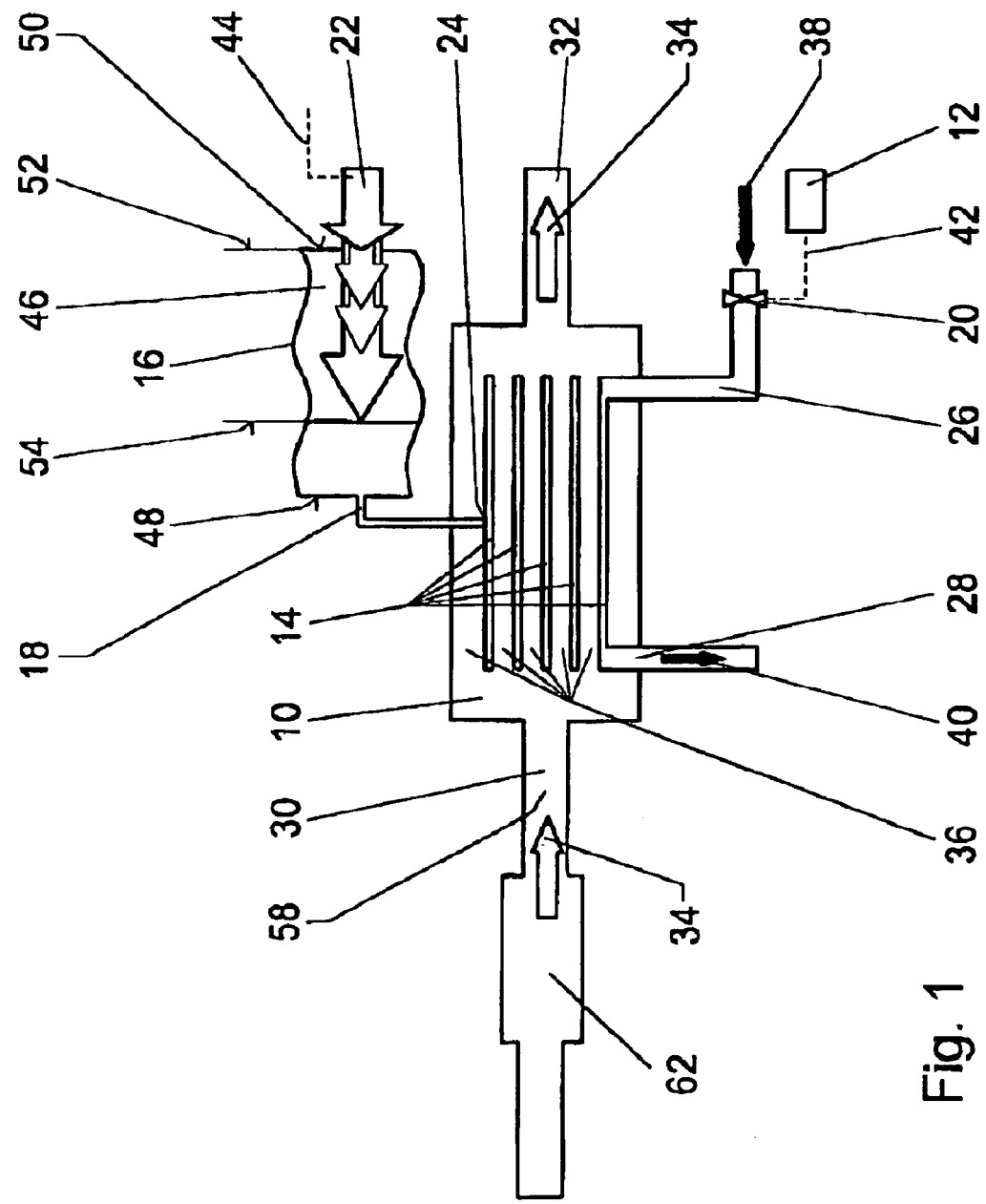

The heat exchanger 10 shown functions according to the countercurrent principle and is arranged in a main exhaust-gas flow 34. It has an exhaust-gas inlet 30 and an exhaust-gas outlet 32 that are connected with each other by way of exhaust-gas ducts 36. Coolant ducts 14, which are connected with a coolant inflow 26 and a coolant return 28, are adjacent to the exhaust-gas ducts 36. The coolant flow is indicated by arrows 38 and 40.

A shutoff device 20 is provided in the coolant inflow 26, which restricts or closes the coolant inflow 26 more or less as a function of the operating and ambient parameters. The shutoff device 20 is controlled by an electronic control device 12 by way of a signal line 42. This can be an integrated component of engine electronics.

The coolant ducts 14 are connected with a gas reservoir 16 by way of a connecting line 18 at a high point 24, which gas reservoir 16 is designed as a bellows and can be changed in its length between lines 52 and 54 by way of an actuator. While the connecting line 18 is provided at the one face 48 of the gas reservoir 16, the actuator acts on the opposite face 50. The actuator 22 is also controlled by the electronic control unit 12 by way of a signal line 44.

When the shutoff device 20 is closed, the actuator 22 begins to function and shortens the bellows 16. As a result, the interior space 46 of the bellows 16 becomes smaller, so that the gas, usually air, is fed into the coolant ducts 14 by way of the connecting line 18 and displaces the coolant there. The coolant can therefore not be heated any further by the exhaust gasses.

Shortly before the shutoff device 20 reopens, the actuator 22 returns to its starting position, whereby it draws the gas from the coolant ducts 14 back into the expanding interior space 46 of the bellows 16. When the passage through the heat exchanger 10 is restored, the coolant can therefore absorb heat from the exhaust air.

An alternative to this is illustrated using dotted lines. In this alternative, the exhaust-gas inlet 30 is connected with the exhaust-gas outlet 32 by way of a bypass line 56. A further shutoff device 58 is provided in the area of the branch of the bypass line 56, which is connected with the control unit 12 by way of a signal line 60 and controls the exhaust-gas inlet 30 and the bypass line 56 in complementary fashion, i.e., the exhaust-gas inlet 30 is restricted or closed that much more, the more the bypass line 56 is opened.

If the shutoff device 20 at the coolant inflow 26 is now closed, the shutoff device 58 closes the exhaust-gas inlet 30 and opens the bypass line 56 almost simultaneously. The exhaust gas is thereby directed past the heat exchanger 10, so that the coolant in the coolant ducts 14 cannot overheat. When the shutoff device 20 opens, the shutoff device 58 also opens the exhaust-gas inlet 30 and closes the bypass line 56.

In order to not dispute the operating behavior of a catalytic exhaust-gas converter 62, is appropriate to arrange the heat exchanger 10 downstream from the catalytic exhaust-gas converter.

What is claimed is:

1. An internal combustion engine, comprising a main exhaust-gas flow, a heat exchanger arranged in said main exhaust-gas flow and having exhaust-air ducts with an exhaust-gas inlet and an exhaust-gas outlet, said heat exchanger having a plurality of cooling ducts with a coolant inflow and a coolant return; a shutoff device provided in said coolant inflow; a gas reservoir connected with said coolant ducts at a high point, and operative so that when said shutoff device is closed and an upper limit temperature of the coolant is reached, gas is directed from said gas reservoir into said coolant ducts and displaces the coolant from said heat exchanger, and the gas is returned to said gas reservoir shortly before said shutoff device is opened; an actuator acting on said gas reservoir; and a control unit connected with said shutoff device and with said actuator and operative so that when said shutoff device is closed and the upper limit temperature of the coolant is exceeded, said control unit acts on said gas reservoir so that gas is supplied from said gas reservoir and the coolant is forced from said heat exchanger shortly before opening of said shutoff device.

2. An internal combustion engine as defined in claim 1, wherein said gas reservoir is formed as bellows having a first face connected with said cooling ducts and a second opposite face on which said actuator acts.

3. An internal combustion engine as defined in claim 1, wherein said actuator is formed as an actuator selected from the group consisting of an electrically operated actuator, a hydraulically operated actuator, and a pneumatically operated actuator.

4. An internal combustion engine as defined in claim 1; and further comprising a bypass provided between said exhaust-gas inlet and said exhaust-gas outlet; a second shutoff device arranged on a branch of said bypass line in order to control said exhaust-gas inlet and said bypass line in a complimentary fashion, so that said bypass line is open to a same degree as said exhaust-gas inlet is restricted and said bypass line is restricted to a same degree as said exhaust-gas line is open.

5. An internal combustion engine as defined in claim 1; and further comprising a catalytic exhaust-gas convertor provided in said main exhaust-gas flow, said heat exchanger being arranged in said main exhaust gas flow behind said catalytic exhaust-gas convertor in a direction of flow.

* * * * *